United States Patent [19]

Mottier et al.

[11] 4,367,916
[45] Jan. 11, 1983

[54] FRESNEL LENS FOR INTEGRATED OPTICS

[75] Inventors: Patrick Mottier; Serge Valette, both of Grenoble, France

[73] Assignee: Commissariat a l'Energie Atomique, Paris, France

[21] Appl. No.: 162,162

[22] Filed: Jun. 23, 1980

[30] Foreign Application Priority Data

Jun. 22, 1979 [FR] France ............... 79 16081

[51] Int. Cl.³ .................. G02B 5/172; G02B 1/00
[52] U.S. Cl. ....................... 350/96.12; 350/452
[58] Field of Search ........ 350/96.12, 167, 451, 350/452, 96.11

[56] References Cited

PUBLICATIONS

Ashley et al.–"Fresnel Lens in a Thin-Film Waveguide", Appl. Phys. Lett. 33(6), Sep. 15, 1978; pp. 490–492.

Primary Examiner—Marvin L. Nussbaum
Attorney, Agent, or Firm—Kerkam, Stowell, Kondracki & Clarke

[57] ABSTRACT

Fresnel lens for integrated optics of the type having a number of overlayers deposited on the surface of a waveguide propagating a wave in accordance with a given propagation mode, the overlayer of order m starting from the axis is of width $l_m = \sqrt{(m+1)\lambda f} - \sqrt{m\lambda f}$ and is at the distance from the axis $r_m = \sqrt{m\lambda f}$ in which f is the focal distance of the lens, $\lambda$ the wavelength of the light in the guide and m a parameter successively assuming the different values of the natural sequence of integers from 1 to p+1, wherein the thickness and/or the length of each film is at least equal to the penetration of absorption distance of the wave guided in or beneath the overlayer for the adopted propagation mode.

14 Claims, 14 Drawing Figures

FRESNEL LENS FOR INTEGRATED OPTICS

BACKGROUND OF THE INVENTION

The present invention relates to a Fresnel-type lens for use in integrated optical structures.

For many years, remote data transmission methods have used transmission by light waves on the basis of light guides which are usually constituted by ultra-fine optical fibres or optical waveguides incorporating a pile of sandwiches formed by alternating layers of transparent materials, which are generally also semiconductive. Thus, the simplest transparent waveguide is a sandwich constituted by a material having a high refractive index inserted between two materials having lower refractive indices. In such a waveguide a light beam is propagated in a zig-zag path in the median layer, whilst undergoing total reflections alternately on one and then on the other of the interfaces. The possibility of producing light sources in the form of a semiconductor diode laser and of obtaining the modulation of the transported light beam by modification of the refractive index of a semiconductor layer by means of applied external electric fields makes it possible to produce a complete circuit for the emission, transmission and decoding of information in light form by methods well known in the construction of integrated semiconductors. It is for this reason that this novel remote data transmission optics is called "integrated optics".

Figure 1:
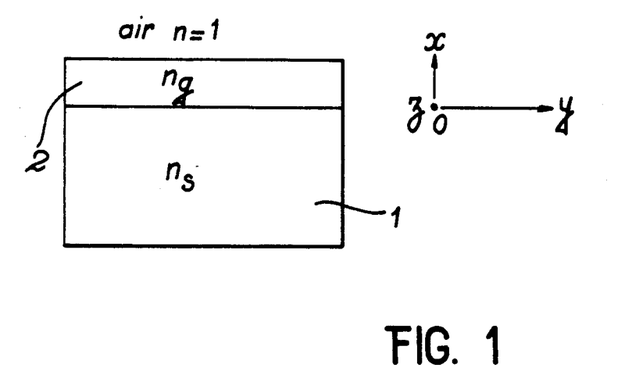
FIG. 1 shows a known optical waveguide structure.

An extremely simple known waveguide construction is shown in FIG. 1. It comprises a substrate 1 of index $n_s$ covered by a guidance layer 2 of index $n_g$. The surrounding air of index $n=1$ serves as the second substrate. In such a waveguide, propagation is assumed to take place in the axis Oz perpendicular to the drawing. The solving of the Maxwell equations shows that there are two possible propagation modes, each corresponding to a particular polarization of the light. In the so-called transverse electrical mode (TE) the electrical field $\vec{E}$ is parallel to the direction Oy, whilst in the so-called transverse magnetic mode (TM) the magnetic field $\vec{H}$ is parallel to the direction Oy. Each of these modes is characterized by its effective propagation index $n_{eff}$, linked with the propagation or transmission speed v of the light wave using formula $$v = \frac{c}{n_{eff}},$$

in which c is the speed of light in vacuo. The value of $n_{eff}$ is itself dependent on the value of the different indices of the layers of the system constituting the waveguide and on their relative thicknesses. Thus, in integrated optics, the speed of a light wave can be modified either by varying the optical index or by varying the thickness of the different layers present. This observation is of fundamental importance and will be used, as will be shown hereinafter, within the scope of the present invention.

Finally, it is useful to recall that the light waves propagating in an optical guide is sometimes evanescent, at least in the two extreme media, i.e. in the substrates. This means that it is not completely contained within the guidance layer, but in a nonhomogeneous manner penetrates immediately adjacent layers by a very limited thickness. In the special case of the waveguide of FIG. 1, the necessary and sufficient condition to obtain the presence of an evanescent wave in the extreme media constituted by substrate 1 and the surrounding air is provided by the following relationship between the different indices of the constituent layers and the effective index:

$$1 < n_s < n_{eff} < n_g.$$

By transposing phenomena known in the conventional optics, attempts have been made to provide in the form of integrated components structures equivalent to the previously known structures in order to ensure the correct propagation of light in a space having only two dimensions instead of the usual three dimensions of conventional optics. Thus, for transforming a plane light wave into a spherical wave, i.e. making a parallel light beam converge at a point called the focus, in conventional optics systems of lenses are used which, to a greater or lesser extent, have optical defects known as aberrations and which lead to inadequacies with regard to the concentration quality of the light at the focus. In order to obviate this disadvantage, the physisist Fresnel developed in conventional optics lenses which are known by his name and which make it possible, by correcting the aberrations due to the two convergent edges of the lenses to obtain an almost perfect concentration of the light at their focus.

Figure 2:
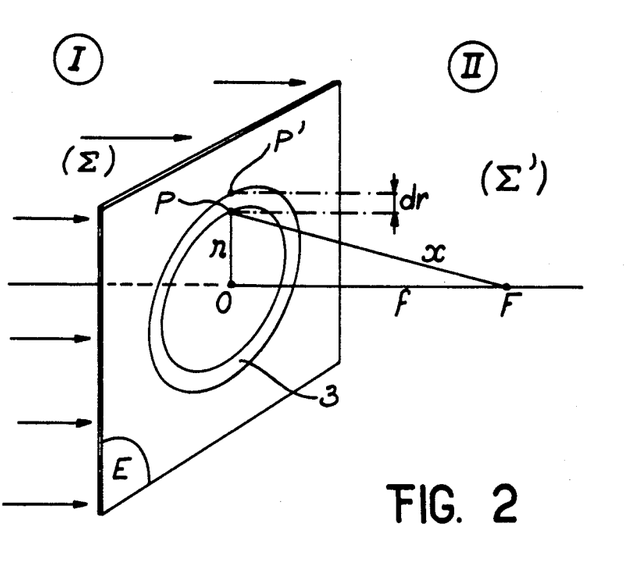
FIG. 2 shows the operation of a conventional Fresnel lens.

With reference to FIG. 2, we will firstly describe the known operating principle of a Fresnel lens in conventional optics. Thus, with reference to FIG. 2, we will consider a plane light wave ($\Sigma$) arriving in zone I in the left-hand part of the drawing on a diffracting wave plane E. On the basis of the Fresnel Huyghens principle, each of the points of screen E can be considered as light source, whose vibrations are of form:

$$A \cos 2\pi \frac{t}{T}.$$

If it is accepted that all the points of screen E are in phase and if this screen is taken as the original of the phases.

It is also possible to take a thin diffractive circular band, like 3 in FIG. 2, and locate it between the two circumferences passing through points P and P' and at distance R from axis O and dr from one another. It is possible to write that the vibration diffracted at a point F of the axis of the system, by the circular band 3 of width dr is, to within a coefficient, of form:

$$A' \, dr \cos 2\pi \left( \frac{t}{T} - \frac{x}{\lambda} \right)$$

in which T is the light vibration cycle, $\lambda$ its wave length, t the time and x the distance between point P and point F. Under these conditions, to obtain the exact expression of the total vibration diffracted by screen E and at point F it is necessary to form the integral of the above expression from O to r, whilst taking account of the fact that:

$$x = \sqrt{r^2 + f^2}$$

In practical terms, Fresnel worked out a more simple method for calculating this integral which consists of breaking down the surface of screen E located around point O into a certain number of elementary annular bands of centre O such that on passing from the band of order m of radius $r_m$ to the band of order m+1 of radius $r_{m+1}$ the distance to point F increases progressively by a half wave length, i.e. $\lambda/2$. It is then possible to write the following equations:

$$x_m = f + m\frac{\lambda}{2} \quad (m \text{ integer})$$

and $$X_m^2 = r_m^2 + f^2.$$

In these formulas, $x_m$ is the distance between point $P_m$ spaced by $r_m$ from point O and point F and $\lambda$ is the light wave length used. By comparing the two above equations, it is possible to write by replacing in the second $x_m^2$ by its value taken from the first:

$$f^2 + mf\lambda + m^2\frac{\lambda^2}{4} = r_m^2 = f^2$$

On ignoring the term in $\lambda 2/4$, which is justified in practice because the wave length $\lambda$ is always well below F we then obtain $r_m = \sqrt{mf\lambda}$.

In other words, in order that the initially imposed condition on the variations in the path of the different vibrations diffracted at E by each of the successive annular bands is repeated, the bands must have radii $r_m$ which intercept like the square root of successive integers.

However, on the basis of the very definition the different circular bands of radii $r_m$ have been selected in such a way that on passing from one to the other, the vibration diffracted at F by one zone is phase-displaced by $\pi$ relative to the preceding, zone, because its path differs by a half wavelength. Therefore, all the annular bands of even rank (m=0, 2, 4, 6 ...) firstly diffract at F vibration components in phase with one another, whilst all the bands of uneven rank (m=1, 3, 5 ...) diffract at F vibration components in phase with one another and the two groups of vibration components are phase-displaced by $\pi$ relative to one another.

Under these conditions, if it is wished that the system is really a lens which rigorously makes the parallel beams of wave ($\Sigma$) of zone I converge in phase at point F of zone II in accordance with the spherical wave ($\Sigma'$) there are two possible solutions:

The first consists of introducing a phase displacement complementary of $\pi$ on all the vibration components of the circular bands of the even rank or uneven rank, thus leading to a so-called phase-displaced Fresnel lens.

The second consists of absorbing the light energy of every other band and only leaving even or uneven bands which, as has been seen, are all in phase. This leads to a so-called absorption Fresnel lens having the disadvantage that the amplitude of the light at point F is divided by 2 and consequently its intensity by 4.

In order to produce a Fresnel lens in integrated optics, it is possible to transpose the teachings in connection with conventional optics in the case where light is propagated in a bidimensional media. Experience has shown that the approximation resulting from the fact that the existence of a propagation in accordance with guided modes is neglected is acceptable.

Figure 3:
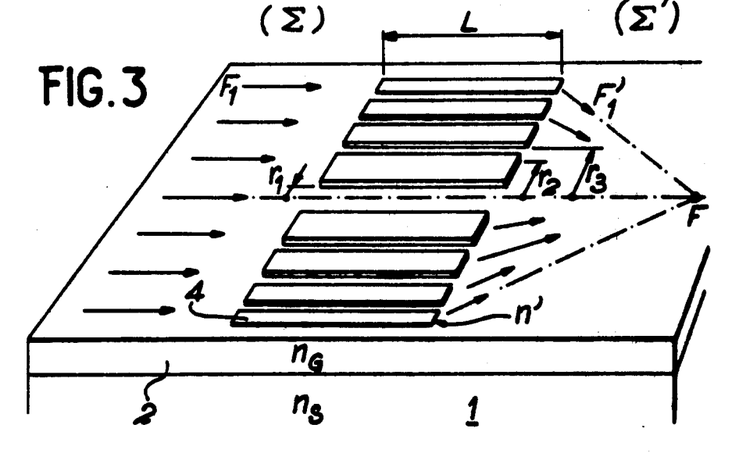
FIGS. 3, 3a, 3b and 4 show the operation of a Fresnel lens utilizing overlayers.
Figure 4:
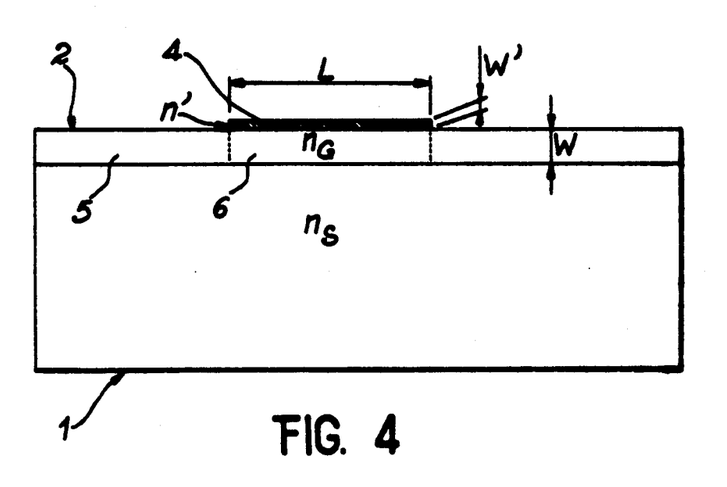

FIG. 3 and FIG. 4, which is a section of FIG. 3 in accordance with one of the overlayers thereof provide a better understanding of the composition of such an integrated Fresnel lens.

This lens also has layers 1 and 2 of the waveguide of FIG. 1 and arrows $F_1$ indicate the light paths of the plane wave ($\Sigma$) reaching the lens, which is to be transformed into a circular wave ($\Sigma'$), whose beams $F_1'$ converge at a point of the axis F constituting the focus of the lens. By comparison with conventional Fresnel lenses, a Fresnel lenses in integrated optics is constituted by a certain number of linear zones parallel to the axis and located at distances rm from the axis such that:

$$r_m = \sqrt{m\lambda f} \quad \text{and} \quad \lambda = \frac{\lambda_o}{n_{eff}}$$

In the formula, $\lambda_o$ is the wavelength in vacuo of the light radiation used. These linear zones ensure either an appropriate phase displacement of half the incident light or a total absorption of half the light rays so as to only permit the passage in the direction of focus F of vibrations which are in phase producing constructional interferences at said point. In practical terms, the various above zones are provided by overlayers 4 constituted by flat films of length L, thickness W' and index n', as has been seen in FIGS. 3 and 4.

Thus, on superimposing over a length L a layer of index n' and thickness W' as indicated in FIG. 4 on the initial structure of FIG. 1 the value of the effective index for the propagation of a wave in accordance with the guided mode TE is changed, whereby $n_{eff}$ in zone 5 becomes $n_{eff}'$ in zone 6. A guided wave propagated in accordance with the mode TE over a length L in said novel structure consequently acquires a phase displacement $$\Delta\phi = \frac{2\pi \Delta nL}{\lambda_o}$$

in which $\Delta n = n_{eff}' = n_{eff}$. Compared with the phase which it had in the initial structure. Thus, by means of overlayers of this type, it is possible to locally modify the phase displacement of a guided wave by changing the multilayer guiding structure, thus obtaining a phase-displaced Fresnel lens.

Figures 5, 5A:
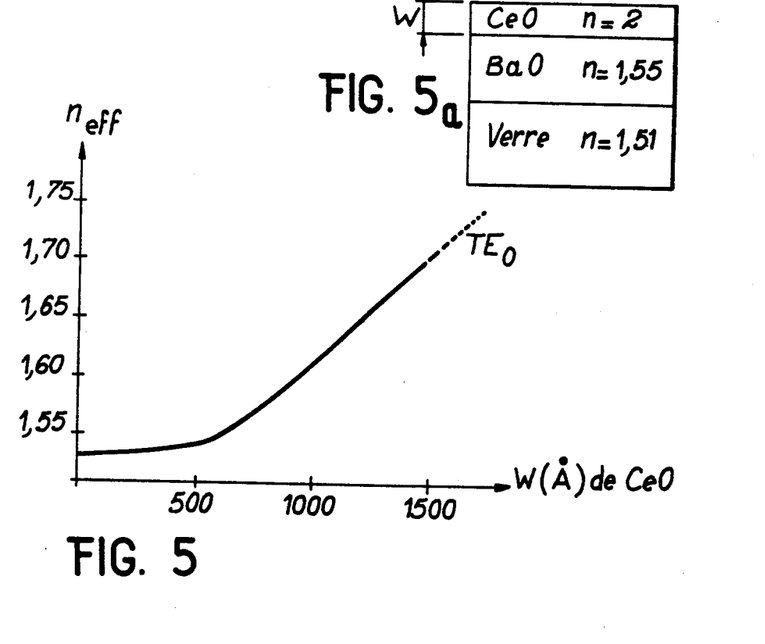
FIG. 5 shows the functional relationship between effective TE mode refractive indices as a function of overlayer thickness.
FIG. 5a shows a section of a flat film Fresnel lens structure having a CeO overlayer.

Such phase-displaced Fresnel lenses in integrated optical form have already been proposed, cf the article "Fresnel lens in a thin-film waveguide" published in Applied Physical Letters 33(6) on 15.9.1978. This article describes an optical phase-displaced Fresnel lens obtained by means of a certain number of overlayers in the form of flat films, the structure being comparable to that shown in FIGS. 3 and 4. More specifically and as shown in FIG. 5a, the substrate is made from a glass of index $n_1 = 1.51$ and the guidance layer is made from barium oxide BaO of index $n_2 = 1.55$, whilst the plates constituting the various overlayers are made from cerium oxides CeO of index $n_3 = 2.0$. Thus, in this construction, the overlayers are formed from a material whose refractive index exceeds that of the wave guide. This has numerous disadvantages, which can be summarized in the following manner:

(a) the light wave, which is homogeneous in the BaO wave guide is also homogeneous in the CeO overlayer of a higher index. Thus, in this case, the effective index of the guided mode increases continuously with the thickness W of the CeO overlayer, necessitating an excellent control of said thickness W.

(b) The different indices introduced by the layer having a higher index than the guide are also very important. In order to introduce a phase displacement of $\pi$, the length L of the engraved motif must be very short leading to low precision with regard to the phase displacement introduced $$\left(\Delta \phi = \pi \frac{\Delta L}{L}\right)$$

because $\Delta L$ is substantially constant and is imposed by technology.

As an example, FIG. 5 shows the real variation curves for $\Delta n_{eff}$ for the mode TE as a function of the thickness W of the CeO overlayer in this case. In the selected working zone (W ~ 1000 Å) the slope $\Delta n_{eff}/dW$ is approximately $2.10^{-4}/Å$ (it should be noted that it is difficult to homogeneously produce layers thinner than 500 Å). With a zone length L of 500 um, this corresponds to a variation of the phase displacement $\Delta \phi$ of $0.033\pi/Å$. This means that the control of the thickness W must be better than 10 Å which is very difficult of even impossible to carry out in the case of mass production. In addition, hitherto, no absorption-type Fresnel lenses have been produced in integrated optics.

BRIEF SUMMARY OF THE INVENTION

The present invention relates to a Fresnel lens for integrated optics which, whilst having the same simple construction as those of the prior art, makes it possible to obviate the difficulties inherent in the precise definition of the length and thicknesses of the different overlayers used on the waveguide. Thus, it can be produced either as phase-displaced lens or as an absorption lens.

Thus, if an overlayer of absorbing material is deposited on the initial structure, the guided wave propagating in accordance with the characteristic modes of this novel structure Are subject to a higher absorption coefficient $\alpha'$ than the coefficient $\alpha$ of the initial structure. If the absorbant material has been deposited in the form of an overlayer of length L, the wave propagating in the thus modified structure has its intensity reduced by a factor $e^{-(\alpha'-\alpha)L}$ compared with a wave propagating in the initial structure. It is of importance to have overlayers leading to high values of the different $(\alpha'-\alpha)$ in such a way that a high local light absorption is obtained, even for low values of L.

The above explanations make it possible to understand that integrated optics makes it possible, by modifying the multilayer waveguide system by means of localised overlayers, to obtain one of the two desired effects (phase displacement or absorption) on even or uneven zones of the incident light in order to produce a Fresnel lens in integrated form).

This Fresnel lens of the type having a number p of overlayers deposited on the surface of a waveguide whereby the overlayer of order m starting from the axis is of width $l_m = \sqrt{(m+1)\lambda f} - \sqrt{m\lambda f}$ and is at the distance from the axis $r_m = \sqrt{m\lambda f}$ in which f is the focal distance of the lens, $\lambda$ the wavelength of the light in the guide and m a parameter successively assuming the different values of the natural sequence of integers from one to p+1, wherein the thickness and/or the length of each film is at least equal to the penetration of absorption distance of the waveguided in or beneath the overlayer for the adopted propagation mode.

As in the case of the prior art phase displacement, to obtain said phase displacement or absorption, the variations in the effective index obtained by adding overlayers to a waveguide structure is used. However, the materials and their different dimensions are selected in such a way that the propagation constantly takes place under conditions for which the effective index variations are saturated as a function of the thickness and/or length of the deposited overlayer.

According to the invention, all this is obtained for phase-displaced Fresnel lenses in accordance with two possible diagrams, namely:

(a) the guided wave is evanescent in the overlayer in which case any thickness W exceeding the penetration depth of the evanescent wave in said layer produces the same effective index variation. In this case, the index of the overlayer must be below that of the effective index for the characteristic modes of the initial structure.

(b) An absorbant overlayer is selected in such a way that the light wave present therein in evanescent or homogeneous form is reduced over a distance $W_A$. Under these conditions, any overlayer thickness $W > W_A$ produces the same effect on the effective indices.

This result can be obtained by using either metallic layers or highly absorbant dielectric layers (e.g. semiconductor with direct gap).

However, this solution has the disadvantage of reducing the modes guided beneath the overlayer. Although the length L necessary for obtaining the phase displacement of $\pi$ are much less than the length L' necessary for producing a significant reduction or attenuation, this effect can be very disadvantageous under certain conditions.

For the construction according to the invention of absorption-type Fresnel lenses, light is absorbed in all the zones of even or uneven rank by giving the length of each overlayer in the light passage direction a length L' which is at least equal to the length for which the wave guided beneath the overlayer is completely absorbed.

An important advantage of this method is that if W is also chosen so that $W > W_A$ and $L > L'$ neither thickness W nor length L are critical parameters.

Conversely, the intensity at the focus, is 4 times lower than in the case of phase-displaced lenses because the amplitude there is reduced by half.

The Fresnel lenses according to the invention still retain the desired precision regarding the transformation of the incident plane wave into a spherical refractive wave, but make it possible to provide precise dimensioning of the lengths and thicknesses of the overlayers deposited on the waveguide surface, which greatly facilitates the mass production of such optical components.

BRIEF DESCRIPTION OF THE DRAWINGS

The invention is described in greater detail hereinafter relative to three non-limitative embodiments of integrated Fresnel lenses and with references to FIGS. 6, 7 and 8, wherein.

DETAILED DESCRIPTION OF THE PREFERRED EMBODIMENTS

The three embodiments of the invention described hereinafter refer to a Fresnel lens constructed on the basis of the waveguide having a common base and composed in the following manner. The substrate is made from silicon dioxide $SiO_2$ obtained by thermal oxidation of silicon. It has a refractive index $n = 1.458$ for the wavelength $\lambda = 6328$ Å.

The guidance layer which covers it is obtained by a deposit by chemical reaction in the vapour phase of silicon oxynitride $SiO_xN_y$. Its refractive index n is 1.60 for the wavelength $\lambda$ 6328 Å and in the selected embodiment its thickness W is equal to 0.42 micrometers.

The formation of a phase-displaced Fresnel lens in which the overlayers are of a dielectric nature will now be described with reference to FIGS. 6 and 6a. The different overlayers deposited on the surface of the waveguide in the form of rectangular films as indicated with reference to FIGS. 3 and 4 are obtained by a vacuum deposition of $SiO_2$. According to the invention the refractive index n of the $SiO_2$ forming the overlayer is equal to 1.458, i.e. it is less than the index n of the guidance layer. The curve of FIG. 6 shows the variations of the effective index of the thus constituted waveguide as a function of the thickness W expressed in Å of the different dielectric overlayers deposited.

Figures 6, 6A:
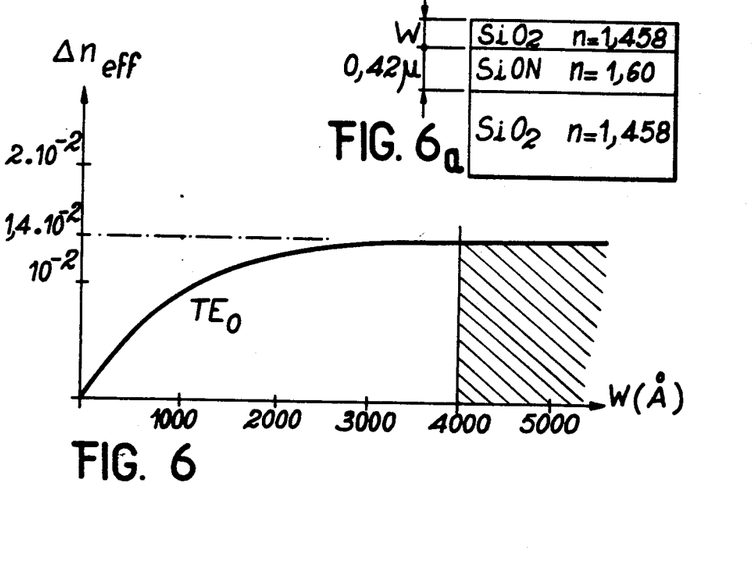
FIG. 6 shows the variation of the effective index as a function of the thickness of the overlayers in the case of a phase-displaced lens with a dielectric overlayer.
FIG. 6a shows diagrammatically, a section through the wave guide with its overlayer.

It can be seen from the curve of FIG. 6 for the mode TE that the effective index variation compared with that of the initial guide is substantially constant and equal to $1.4.10^{-2}$ when the thickness W reaches and exceeds 4000 Å. Thus, it is merely necessary to deposit overlayers of thickness W higher than 4000 Å to be certain that the effective index variation compared with the index of the supporting waveguide is constant and equal to $1.4.10^{-2}$. When this condition is fulfilled, it is easily possible to calculate the length L necessary for each overlayer in the light propagation direction in order to obtain a phase displacement of the wave equal to $\pi$. Thus, the phase displacement $\Delta\phi$, length L and variation $\Delta n$ of the index are linked by the formula:

$$\Delta\phi = \frac{2\pi \Delta n L}{\lambda_o}$$

is $\Delta\phi = \pi$, we obtain $$L = \frac{\lambda}{2\Delta n},$$

i.e. in the specific case $$L = \frac{6328.10^{-4}}{2.1\,4.10^{-2}}.$$

Under these conditions, i.e. when W exceeds 4000 Å, the phase displacement introduced is completely independent of the thickness, which greatly facilitates the production of the lens.

Figures 7, 7A:
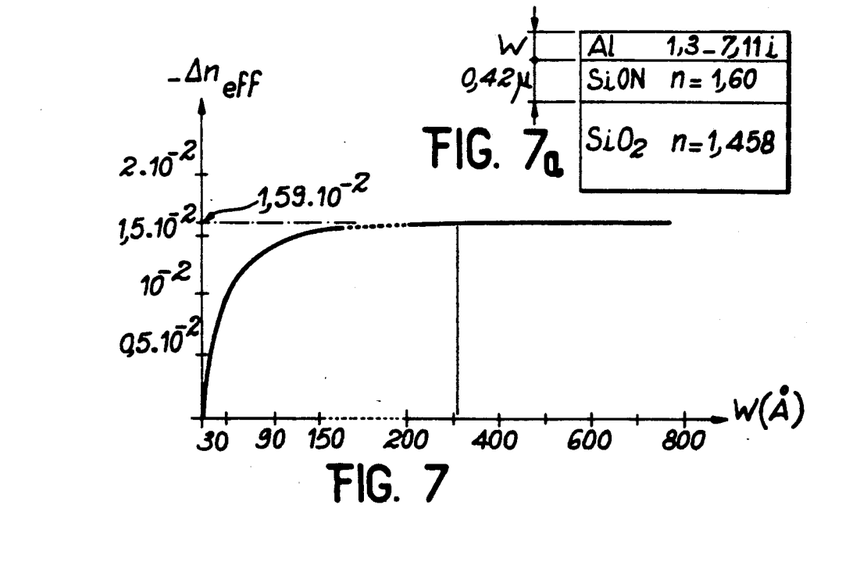
FIG. 7 shows the variations of the effective index as a function of the thickness of the overlayer expressed in A in the case of a phase-displaced lens with an absorbing overlayer.
FIG. 7a shows the section through the waveguide corresponding to the embodiment of FIG. 7.

FIGS. 7 and 7a relate to a phase-displaced Fresnel lens constituted by the same waveguide and by adding a series of overlayers disposed as in the previous embodiment, but made from an absorbing material, in this case aluminium with a complex index 1.3–7.11i.

FIG. 7 gives the variation $\Delta n_{eff}$ as a function of the thickness W of the overlayers. $\Delta n_{eff}$ is saturated above the thickness 300 Å at value $-1.59.10^{-2}$ corresponding to a length L for each overlayer of approximately 19.9 um for a phase displacement of $$\left(\text{with also } \frac{d\phi}{dW} = 0\right).$$

Thus, the length L corresponding to a phase displacement of is written in this case $$L = \frac{6328.10^{-4}}{2.1,59.10^{-2}}.$$

It should be noted that in this case $\Delta n_{eff}$ is negative because of the negative value of the real part of the dielectric constant of the metal.

As in the previous embodiment, through working with overlayers having a thickness greater than 300 Å, it is possible to obviate any stability problem with regard to the thickness of the overlayers deposited during the manufacturing process on an industrial scale.

Figures 8, 8A:
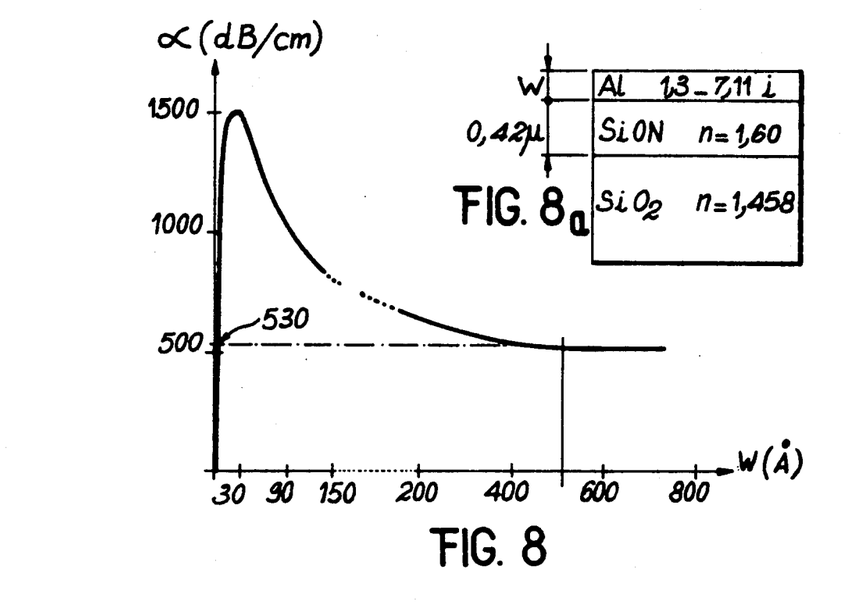
FIG. 8 shows the variations of the absorption α expressed in decibels/centimeters as a function of the thickness of the overlayer deposited on the waveguide surface for an absorption-type lens.
FIG. 8a shows a section through the waveguide corresponding to the curve of FIG. 8.

FIGS. 8 and 8a relate to the production of an absorption-type Fresnel lens by means of overlayers according to FIGS. 3 and 4. The structure used for the initial waveguide and the overlayers is the same with regards to the materials, but in this case the thickness of the aluminium overlayers is made greater than 500 Å so as to be able to work with a constant, equal absorption level of 530 db/cm, as shown in FIG. 8.

If under these conditions it is desirable, for example, to have a reduction in the intensity of a factor 1000, which corresponds to a 30 db absorption a simple proportionality calculation shows that the interaction length L of each overlayer must be equal to 30/530 cm = 565 um. Thus, during manufacture, it is safely possible to use overlayers having both a thickness greater than 500 Å and a length greater than 565 μm, whilst still being certain to obtain an absorption corresponding to an intensity reduction in a ratio of at least 1000 between the incident light and the outgoing light for those zones of the lens (of even or uneven rank) selected for the absorption of the light radiation.

In comparing the present embodiment with that of the phase-displaced lens having aluminium overlayers, it should be noted that in the latter case the interaction length of 19.9 um corresponded to a light absorption of 1 db, i.e. virtually negligible and without common measure with that voluntarily required in the case of an absorption-type lens.

It is obvious that the above description only refers to films 4 for having a rectangular configuration (FIG. 3) for illustration purposes and other shapes can obviously be used. Thus, it is known that in conventional optics, a Fresnel lens can be formed by a sequence of rings in the form of meniscus portions, which can be either planoconvex or planoconcave. The phase displacement produced by such structures varies in accordance with the thickness of the material traversed.

Figure 3A:
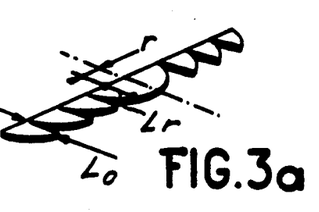
Figure 3B:
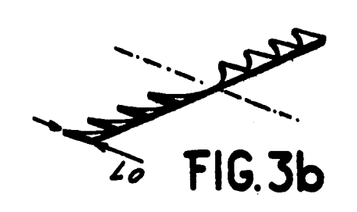

These special constructional procedures can also be adopted in the invention in which case the rear face of the rectangular films 4 of FIG. 3 in which the face is planar can be replaced by a convex face (FIG. 3a) or the front face of said films can be replaced by a concave face (FIG. 3b). The length L of the pieces is then no longer constant, said length L(r) depending on the distance r from the axis of the lens in accordance with the following formulas:

(a) in the case where the variation $\Delta n_{eff}$ of the effective index is positive:

$$L(r) = mL_0 - \frac{L_0}{\lambda_0}\left[\sqrt{r^2 + f^2} - f\right]$$

in which m is an integer representing the rank of the ring in question. The integer m is increased by 1 unit whenever L(r) can be cancelled out, i.e. whenever there is a transition from one ring to the next. The rank m is made equal to 1 for r=0, giving at the centre a thickness L (r=0).

(b) In the case where $\Delta n_{eff}$ is negative:

$$L(r) = -mL_0 + \frac{L_0}{\lambda_0}\left[\sqrt{r^2 + f^2} - f\right]$$

with the same notations, taking m=0 for r=0.

In both cases, the thickness $L_0$ is taken in such a way that there is a phase displacement of $2\pi$ on the lens axis, giving $$\frac{2\pi}{\lambda} \Delta n_{eff} L_0 = 2\pi.$$

What is claimed is:

1. A phase displaced Fresnel lens for integrated optics, the lens having an optical axis, comprising a waveguide and arranged in symmetrical fashion on each side of the optical axis of the lens, a number p of overlayers disposed on the surface of said waveguide propagating a wave in accordance with a given propagation mode, the overlayer of order m from the axis having a width $$l_m = \sqrt{(m + 1)\lambda f}$$

and a distance from the axis of $r_m = \sqrt{m\lambda f}$ in which f is the focal length of the lens, m is a parameter taking successively the different values of the natural sequence of integers between 1 to p and $\lambda$ is the wavelength utilized, said overlayers of even or odd rate in the direction perpendicular to the movement of the light having a thickness w greater than the value for which the effective index of the subjacent part of the waveguide saturates, the phase displacement $\pi$ of the luminous vibration at the level of said overlayers of even or odd rate resulting solely from the choice of the length L of each of said overlayers in the direction of progression of the light.

2. A phase-displacement Fresnel lens according to claim 1 in which said p overlayers are of dielectric material having an index of refraction less than the effective index of the waveguide for the propagation mode utilized, the waveguide then being evanescent in said p overlayers and said p overlayers being of thickness greater than the depth of penetration of the evanescent wave in said overlayers.

3. A phase-displaced Fresnel lens according to claim 1, said p overlayers being an absorbent material with a thickness w greater than the thickness of absorption of the wave.

4. An absorption Fresnel lens for integrated optics, the lens having an optical axis, comprising a waveguide and arranged in symmetrical fashion on each side of the optical axis of the lens, a number p of overlayers disposed on the surface of said waveguide propagating a wave in accordance with a given propagation mode, the overlayer of order m from the axis having a width $$l_m = \sqrt{(m + 1)\lambda f} - \sqrt{m\lambda f}$$

and a distance from the axis of $r_m = \sqrt{m\lambda f}$ in which f is the focal length of the lens, m is a parameter taking successively the different values of the natural sequence of integers between 1 to p and $\lambda$ is the wavelength utilized, said overlayers being of absorbent material whereby the total absorption of light in the parts of the waveguide corresponding to the overlayer of even or odd rate has in the direction of propagation of the light a length L' at least equal to the length for which the wave guided under the overlayer is entirely absorbed.

5. An absorption Fresnel lens in accordance with claim 4 in which the thickness w of each of said overlayers in a direction perpendicular to the propagation of the light is greater than the thickness of penetration of the wave in said overlayers.

6. A Fresnel lens in accordance with claim 2, the waveguide having a substrate of $SiO_2$ coated with a layer of silicon oxynitride $SiO_xN_y$, said overlayers being $SiO_2$.

7. A Fresnel lens in accordance with claim 3, the waveguide having a substrate of $SiO_2$ coated with a layer of silicon oxynitride $SiO_xN_y$, said overlayers being aluminum.

8. A Fresnel lens in accordance with claim 4, the waveguide having a substrate of $SiO_2$ coated with a layer of silicon oxynitride $SiO_xN_y$, said overlayers being aluminum.

9. A Fresnel lens in accordance with claim 1, or claim 2, or claim 3, or claim 4, or claim 5 or claim 6 or claim 7 in which said overlayers are rectangular films.

10. A Fresnel lens in accordance with claim 1, or claim 2, or claim 3, or claim 4, or claim 5, or claim 6, or claim 7, said overlayers having at least one convex exit face for the light.

11. A Fresnel lens in accordance with claim 1, or claim 2, or claim 3, or claim 4, or claim 5, or claim 6, or claim 7, said overlayers having at least one concave entrance face for the light.

12. A Fresnel lens in accordance with claim 1, or claim 2, or claim 3, or claim 4, or claim 5, or claim 6, or claim 7, or claim 8, in which said overlayers are rectangular films.

13. A Fresnel lens in accordance with claim 1, or claim 2, or claim 3, or claim 4, or claim 5, or claim 6, or claim 7, or claim 8, said overlayers having at least one convex exit face for the light.

14. A Fresnel lens in accordance with claim 1, or claim 2, or claim 3, or claim 4, or claim 5, or claim 6, or claim 7, or claim 8, said overlayers having at least one concave entrance face for the light.

* * * * *